United States Patent [19]

Seibel et al.

[11] Patent Number: 5,717,305
[45] Date of Patent: Feb. 10, 1998

[54] METHOD AND APPARATUS FOR STARTING AN ELECTRIC MOTOR

[76] Inventors: Brian J. Seibel, 1629 Bobolink Ave., Grafton, Wis. 53024; Timothy M. Rowan, 1932 N. 71st St., Wauwatosa, Wis. 53213; Russel J. Kerkman, 6815 W. Howard Ave., Milwaukee, Wis. 53220; Kevin G. Stachowiak, 2424 S. 67th St., West Allis, Wis. 53219

[21] Appl. No.: 673,657

[22] Filed: Jun. 28, 1996

[51] Int. Cl.$^6$ .................................................. H02P 1/26
[52] U.S. Cl. ........................... 318/778; 318/798–815; 318/432; 318/453; 318/479
[58] Field of Search ...................... 318/778, 798–815, 318/432, 445, 479, 453–455

[56] References Cited

U.S. PATENT DOCUMENTS 5,479,081  12/1995  Seibel et al. .................. 318/805 X Primary Examiner—Karen Masih
Attorney, Agent, or Firm—Patrick S. Yoder; John M. Miller; John J. Horn

[57] ABSTRACT

A method and apparatus for controlling an AC motor are described wherein a frequency generator is configured to generate a signal representative of the stator electrical frequency and to estimate the rotor electrical frequency of the motor during operation. The generator operates on torque and flux current reference signals and on d-axis voltage reference and feedback signals to determine the electrical frequencies. The generator ramps up gain values applied to the torque current reference signals and to a voltage error signals representative of the difference between the d-axis voltage reference and feedback signals during a startup phase of operation to enhance performance and stability of the drive during this phase. The generator includes feedforward and feedback portions that contribute components of the final stator frequency signal. The components are filtered differently during startup and running phases of operation to provide the desired frequency signals.

19 Claims, 5 Drawing Sheets

METHOD AND APPARATUS FOR STARTING AN ELECTRIC MOTOR

BACKGROUND OF THE INVENTION

The present invention relates generally to the startup and control of AC electric motors. More particularly, the invention relates to a method and apparatus for starting an electric motor and for subsequent variable frequency field oriented control of an electric motor utilizing a frequency generating technique.

Vector, or field oriented control techniques are generally known for variable speed control of industrial AC motors. In general, such techniques attempt to determine and apply the proper driving signals to the motor to maintain the orientation of "q-axis" rotor flux to zero. In one known technique, termed "indirect field oriented control" rotor flux is identified by analysis of feedback signals representative of rotor shaft position and by estimating slip in the motor. Assuming the slip estimate is correct, this analysis permits resolution of the stator current into a torque producing or "q-axis" component and a flux producing, or "d-axis" component. By knowing and using these components of stator current, the motor drive can properly control the amount of current applied to the motor so as to respond to changing load requirements, while maintaining proper vector orientation (i.e. q-axis rotor flux of zero). These techniques generally provide excellent dynamic torque response and accurate steady state torque as compared to other approaches, such as slip controlled drives.

A difficulty in known field oriented motor controllers arises from thermal variation of motor parameters. When not properly accounted for, such variations can substantially degrade the performance of the controller, resulting in a slip controlled drive. Various solutions have been proposed to account for thermal variations to achieve field oriented control. In one known technique, motor voltage is sensed and used as a basis for adapting for thermal variation of rotor resistance, and the d-axis component of motor voltage is used to identify the slip gain necessary to orient the q-axis rotor flux to zero. This value of slip gain is then multiplied by the torque current command to provide the desired slip frequency. The stator electrical frequency is determined using the resultant slip frequency value. A rotor shaft encoder provides feedback of rotor position and speed, and the rotor electrical frequency can be calculated based upon this speed and the rated motor frequency and number of pole pairs. Finally, the stator electrical frequency can be determined from the rotor electrical frequency and the slip frequency. The resulting stator electrical frequency is then used to control stator current so as to maintain the desired orientation of the q-axis component of rotor flux and achieve field oriented control. An example of a field oriented motor controller of this type is described in U.S. Pat. No. 5,032,771 issued on Jul. 16, 1991 to Kerkman et at., and hereby incorporated herein by reference.

While such controllers do achieve superior field oriented control, they are not without drawbacks. For example, because sensed values of rotor position and speed are used to determine rotor electrical frequency, feedback signals must be generated by encoders or similar feedback devices and continuously analyzed. While attempts have been made to provide sensorless field oriented control, many have resulted in drives having poor dynamic performance. Moreover, certain known control implementations comprise inaccurate or low bandwidth current controllers, and inadequately compensate for second order effects such as power switching device characteristics, and thus do not achieve field oriented control.

Another difficulty in such control devices is the proper adjustment of control parameters, including system gains, bandwidths and the like during the various phases of operation. For example, depending upon the technique employed to control the motor, certain system gains must be adjusted with respect to one another in order to achieve proper torque during starting, while maintaining system stability and proper field orientation. These difficulties become particularly troublesome for drives designed to operate without speed feedback signals from the driven motor.

There is a need, therefore, for an improved controller for driving AC motors that is capable of providing smooth and stable starting in addition to sensorless field oriented control. In particular, there is a need for a motor controller that is capable of properly adjusting key system gains and bandwidths in order to achieve the desired level of control both during startup and subsequent running of the motor.

SUMMARY OF THE INVENTION

The invention features a novel technique for controlling an AC electric motor designed to respond to these needs. The technique generates stator frequency directly from a feedback voltage and a reference voltage in the synchronous reference frame without recourse to sensed speed feedback signals. The frequency generator includes a feedforward portion and a feedback portion, each generating frequency-related signals that are combined to determine the stator frequency. The generator is configured to properly adjust or adapt system gains and bandwidths with respect to one another during startup of the motor and for subsequent steady state operation. The resulting field oriented control offers excellent low speed adjustability as well as stable performance during startup.

Thus, in accordance with a first aspect of the invention, a method is provided for starting an alternating current electric motor having a stator and a rotor. The method comprises the steps of generating a first component of an electrical frequency signal from a voltage reference signal, a voltage feedback signal, and a current reference signal, and generating a second component of the electrical frequency signal from the first component and from the current reference signal. The first and second components of the frequency signal are filtered in a first manner during a startup phase of operation of the motor, and a filtered in a second manner following the startup phase of operation. The components are then combined to generate the electrical frequency signal as a basis for generating control signals for driving the motor.

In accordance with another aspect of the invention, a method is provided for control of an alternating current electric motor having a rotor and a stator. The method includes the steps of generating a torque current command signal representative of a desired current and multiplying the current command signal by a first gain value. A d-axis voltage command signal representative of a desired voltage and a d-axis voltage feedback signal representative of actual voltage applied to the motor are also generated and are combined to generate a voltage error signal. The voltage error signal is multiplied by at least a second gain value and the signals produced by applying the first and second gain values to their respective signals are combined to generate a frequency signal as a basis for regulating control signals for driving the motor. The first and second gain values are then increased as the motor increases speed during a stamp phase of operation.

The invention also provides an apparatus for controlling an electric motor including a power circuit, regulating circuitry, feedback circuitry and control circuitry. The power circuit includes an inverting circuit for converting direct current power to controlled alternating current power for driving the motor in response to control signals. The regulating circuitry is configured to generate current reference signals representative of desired current levels. The feedback circuitry is configured to generate voltage feedback signals representative of voltage applied to the motor. The control circuitry is coupled to the power circuit, the regulating circuit and the feedback circuit. The control circuit is configured to receive the current reference signals and the voltage reference signals and to generate the control signals for converting the direct current power to controlled alternating current power. The control circuitry includes a frequency generator configured to generate the stator electrical frequency signal in a first manner during a startup phase of operation of the motor and in a second manner following the startup phase of operation.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
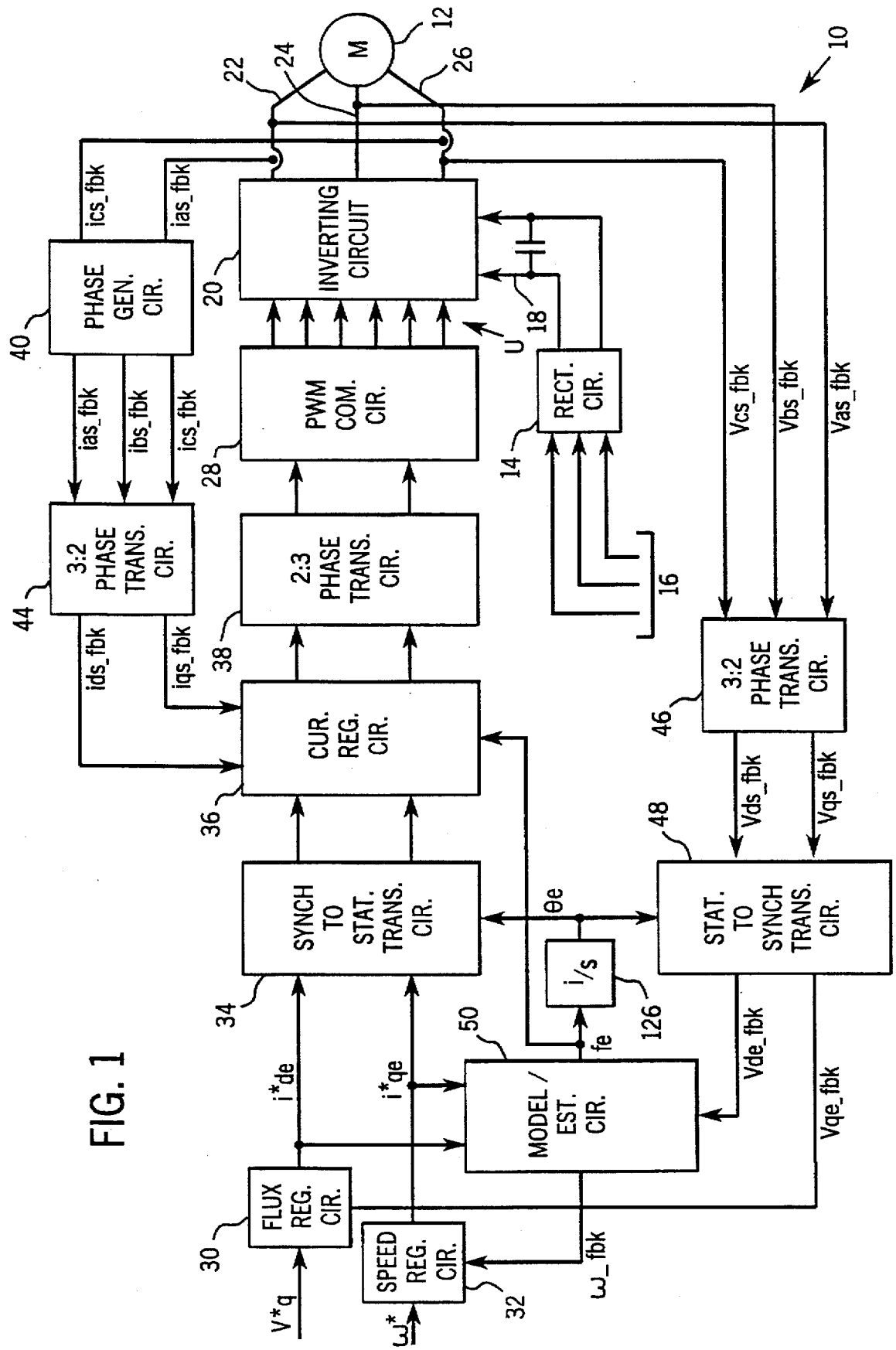
FIG. 1 is a diagrammatical view of a motor controller for driving an AC electric motor at various desired speeds, including a module for estimating rotor frequency and generating stator frequency.

Turning now to the drawings and referring to FIG. 1, a controller 10 for driving a motor 12 is illustrated diagrammatically. Controller 10 includes a power converter circuit 14 designed to be coupled to a source of 3-phase AC power 16 and configured to rectify the AC power from the source and to convert the AC power to constant magnitude DC power that is output from converter circuit 14 over a DC bus 18. Controller 10 also includes an inverter circuit 20 coupled to converter circuit 14 via the DC bus 18 for generating DC power transmitted over bus 16 to voltage, frequency and current controlled AC power for driving motor 12. Inverter circuit 20 typically includes an array of solid state switching devices, such as IGBT's, that are switched between conducting and non-conducting states in response to control signals to generate the controlled AC power in the form of pulse-width-modulated (PWM) signals of fixed magnitude and varying pulse width approximating sinusoidal AC power waveforms, in a manner generally known in the art. These controlled AC power waveforms are then transmitted to motor 12 via a, b and c phase conductors 22, 24 and 26 to drive motor 12 at desired speeds and in response to varying loads. Power converter circuit 14 and inverter circuit 20 may conveniently be formed on a power substrate board (not shown) and electrically coupled via conductive traces forming DC bus 18.

Signals for switching elements of inverter circuit 20 are applied to circuit 20 by a PWM command circuit 28 in response to functional circuits configured to convert command and feedback signals to control signals as described below. Certain of the functional circuits, preferably configured in an appropriately programmed microprocessor, are illustrated diagrammatically in FIGS. 1, 2 and 3. These include a flux regulating circuit 30, a speed regulating circuit 32, a synchronous-to-stationary transformation circuit 34, a current regulating circuit 36, a two-to-three phase transformation circuit 38, phase signal generating circuit 40, three-to-two phase transformation circuits 44 and 46, stationary-to-synchronous transformation circuit 48, and motor model and frequency generator circuit 50. The operation of these functional circuits will be described in greater detail below.

In the following description of motor controller 10, the following nomenclature will be used to refer to the various signals and values generated by the functional circuitry of controller 10 for controlling the speed and torque of motor 12:

| | |
|---|---|
| q-axis | quadrature axis component of various parameters (for the present purposes, where field orientation is maintained, the q-axis component of stator current corresponds to a torque producing current component; the use of q-axis nomenclature with respect to voltage signals is defined below with reference to equation (13)); |
| d-axis | direct axis component of various parameters (90 degrees lagging the q-axis; for the present purposes, where field orientation is maintained, the d-axis component of stator current corresponds to a flux producing current component; the use of d-axis nomenclature with respect to voltage signals is defined below with reference to equation (11)); |
| fe | stator electrical frequency; |
| fr | rotor electrical frequency; |
| f | intermediate frequency signal; |
| fe_ave | filtered stator frequency; |
| fr_ave | filtered rotor frequency estimate; |
| fe_base | rated frequency; |
| Gn | non-linear gain; |
| ias_fbk | stationary reference frame current of a phase; |
| ibs_fbk | stationary reference frame current of b phase; |
| ics_fbk | stationary reference frame current of c phase; |
| ide | synchronous reference frame current of d-axis; |
| i*de | command current for d-axis in synchronous reference frame; |
| i*ds | command current for d-axis in stationary reference frame; |
| iqe | synchronous reference frame current of q-axis; |
| i*qe | command current for q-axis in synchronous reference frame; |
| i*qs | command current for q-axis in stationary reference frame; |
| kff | feed forward gain; |
| ki | integral gain; |
| kp | proportional gain; |
| ks | slip gain; |
| Lm | magnetizing inductance; |
| Lr | rotor inductance; |
| Ls | stator inductance; |

-continued

| | |
|---|---|
| rs | stator resistance; |
| U | switching control signals for generating a controlled PWM waveform; |
| V*as | command stationary reference frame voltage of a phase; |
| Vas_fbk | feedback stationary reference frame voltage of a phase; |
| V*bs | command stationary reference frame voltage of b phase; |
| Vbs_fbk | feedback stationary reference frame voltage of b phase; |
| V*cs | command stationary reference frame voltage of c phase; |
| Vcs_fbk | feedback stationary reference frame voltage of c phase; |
| V*de | model reference voltage for d-axis in synchronous reference frame; |
| Vde_fbk | feedback voltage for d-axis in synchronous reference frame; |
| V*ds | command stationary reference frame voltage for d-axis; |
| Vds_fbk | stationary reference frame voltage feedback of d-axis; |
| Vqe | synchronous reference frame voltage of q-axis; |
| Vqe_fbk | synchronous reference frame voltage feedback for q-axis; |
| V*qs | command stationary reference frame voltage of q-axis; |
| Vqs_fbk | stationary reference frame voltage feedback of q-axis; |
| θe | stator electrical angular position used in reference frame transformations; |
| λde | d-axis stator flux; |
| λqe | q-axis stator flux; |
| λqr | q-axis rotor flux; |
| σ | inductance factor; |
| ω_fbk | speed (frequency) feedback. |

As illustrated in FIG. 1, command inputs to controller 10 include a voltage reference signal V*q for the q-axis and a speed reference signal ω*. Voltage reference signal V*q is determined by an autocommissioning procedure, such as by reference to a saturation curve for motor 12 or application of no-load current to motor 12. Speed reference signal ω* is set to a desired value by an operator, such as via a human interface module (not shown), or by a system controller or network with which controller 10 is interfaced. Flux regulating circuit 30 receives voltage reference signal V*q as well as a q-axis voltage feedback signal Vqe_fbk and converts these signals to a d-axis current command signal i*de in the synchronous reference frame. Operation of flux regulating circuit 30 is described in greater detail in U.S. Pat. No. 5,032,771, mentioned above, and U.S. Pat. No. 5,479,081, assigned to the assignee of the present invention and hereby incorporated herein by reference. In general, i*de is a fixed value within a constant torque operating range of motor 12. Speed regulating circuit 32 receives speed reference signal ω* as well as a speed feedback signal ω_fbk, and converts these signals to a q-axis current command signal i*qe in the synchronous reference frame. The operation of speed regulating circuit 32 is described in greater detail in U.S. Pat. No. 5,032,771. In general, speed regulating circuit 32 is a closed loop PI controller of a type well known in the art. As will be appreciated to those skilled in the art, it should also be noted that, while for the purposes of the present description the current reference signal for the q-axis is generated by circuit 32 based upon a speed input, the q-axis current reference signal could also be based upon a frequency input or upon a torque input value. Current reference signals i*de and i*qe are then applied to synchronous-to-stationary transformation circuit 34 for conversion into the stationary reference frame in accordance with the following relationships:

$$\begin{bmatrix} i^*qs \\ i^*ds \end{bmatrix} = \begin{bmatrix} \cos\theta_e & \sin\theta_e \\ -\sin\theta_e & \cos\theta_e \end{bmatrix} \begin{bmatrix} i^*qe \\ i^*de \end{bmatrix} \quad (1)$$

where θe is the stator electrical angular position determined from the generated frequency fe as described below. Thus, transformation circuit 34 generates output signals i*ds and i*qs representative of command current for the d and q axes, respectively, in the stationary reference frame.

The command current values generated by transformation circuit 34 are applied to current regulating circuit 36 for conversion into command voltages for the d and q axes in the stationary reference frame, V*ds and V*qs, respectively. For generating the required command voltage signals, current regulating circuit 36 receives a generated frequency signal fe from model and generating circuit 50, and current feedback signals for the d and q axes, ids_fbk and iqs_fbk. The generation of frequency signal fe will be described in greater detail below, with particular reference to FIGS. 2 and 3. The generation of current feedback signals ids_fbk and iqs_fbk are described below. The operation of and calculations performed by current regulating circuit 36 are described in greater detail in U.S. Pat. No. 4,706,012, assigned to the assignee of the present invention and hereby incorporated herein by reference.

From current regulating circuit 36, command voltage signals V*ds and V*qs are applied to two-to-three phase transformation circuit 38. Transformation circuit 38 converts the command voltage signals from d- and q-axes based signals into stationary reference frame voltage command signals for 30 three phases a, b and c in accordance with the following relationships:

$$V^*as = V^*qs; \quad (2)$$

$$V^*bs = (-1/2)V^*qs - (\sqrt{3}/2)V^*ds; \quad (3)$$

$$V^*cs = (-1/2)V^*qs + (\sqrt{3}/2)V^*ds. \quad (4)$$

The stationary reference frame voltage command signals V*as, V*bs and V*cs are applied to PWM command circuit 28 for conversion into switching command signals, designated generally by the letter U, for altering the conductive state of switching devices within inverter circuit 20. The operation of PWM command circuit 28 is generally known in the art. In general, circuit 28 generates high frequency switching command signals timed to produce pulse-width-modulated output waveforms for the a, b and c phases that approximate sinusoidal AC power signals of a frequency, voltage and current level required to drive motor 12 at desired speeds. These controlled PWM output waveforms for the three electrical phases are then transmitted to motor 12 via conductors 22, 24 and 26. It should be noted that controller 10 could be configured differently from the preferred structure described above while nevertheless implementing the frequency generating and estimating techniques described herein. For example, circuits 34, 36 and 38 may be configured to control voltage rather than regulating current.

Feedback signals required for operation of controller 10 are based upon sensed levels of voltage and current. As illustrated in FIG. 1, current feedback signals ias_fbk and ics_fbk are sensed from the corresponding conductors for these phases, 22 and 26, respectively. These current feedback signals are applied to phase signal generating circuit 40 wherein a signal representative of the current in the third phase is derived from the relationship:

$$ibs\_fbk = -ias\_fbk - ics\_fbk. \quad (5)$$

The three phase current feedback signals are then applied to three-to-two phase transformation circuit 44 for resolution into current feeback components for the d and q axes in the stationary reference frame, ids_fbk and iqs_fbk, respectively, in accordance with the relationships:

$$iqs\_fbk = ias\_fbk; \qquad (6)$$

$$ids\_fbk = (-1/\sqrt{3})ibs\_fbk + (1/\sqrt{3})ics\_fbk \qquad (7)$$

These current feedback signals are then applied to current regulating circuit 36 for use in generating d- and q-axes voltage command signals V*ds and V*qs.

Voltage feedback signals for the a, b and c phases are generated from voltage sensed in conductors 22, 24 and 26, respectively. These sensed voltages, Vas_fbk, Vbs_fbk and Vcs_fbk are applied to three-to-two phase transformation circuit 46 for resolution into voltage feedback signals for the d and q axes in the stationary reference frame in accordance with the relationships:

$$Vqs\_fbk = Vas\_fbk; \qquad (8)$$

$$Vds\_fbk = (-1/\sqrt{3})Vbs\_fbk + (1/\sqrt{3})Vcs\_fbk \qquad (9)$$

To facilitate the control and generation functions of motor model and frequency generator circuit 50 voltage feedback signals for the d and q axes are converted to the synchronous reference frame by transformation circuit 48, in accordance with the relationships:

$$\begin{bmatrix} Vqe\_fbk \\ Vde\_fbk \end{bmatrix} = \begin{bmatrix} \cos\theta_e & -\sin\theta_e \\ \sin\theta_e & \cos\theta_e \end{bmatrix} \begin{bmatrix} Vqs\_fbk \\ Vds\_fbk \end{bmatrix}$$

The voltage feedback signal for the d-axis, Vde_fbk, is then applied to motor model and frequency generator circuit 50, while the q-axis voltage feedback signal, Vqe_fbk, is applied to flux regulating circuit 30 for use in generating the d-axis current command signal i*de.

Figure 2:
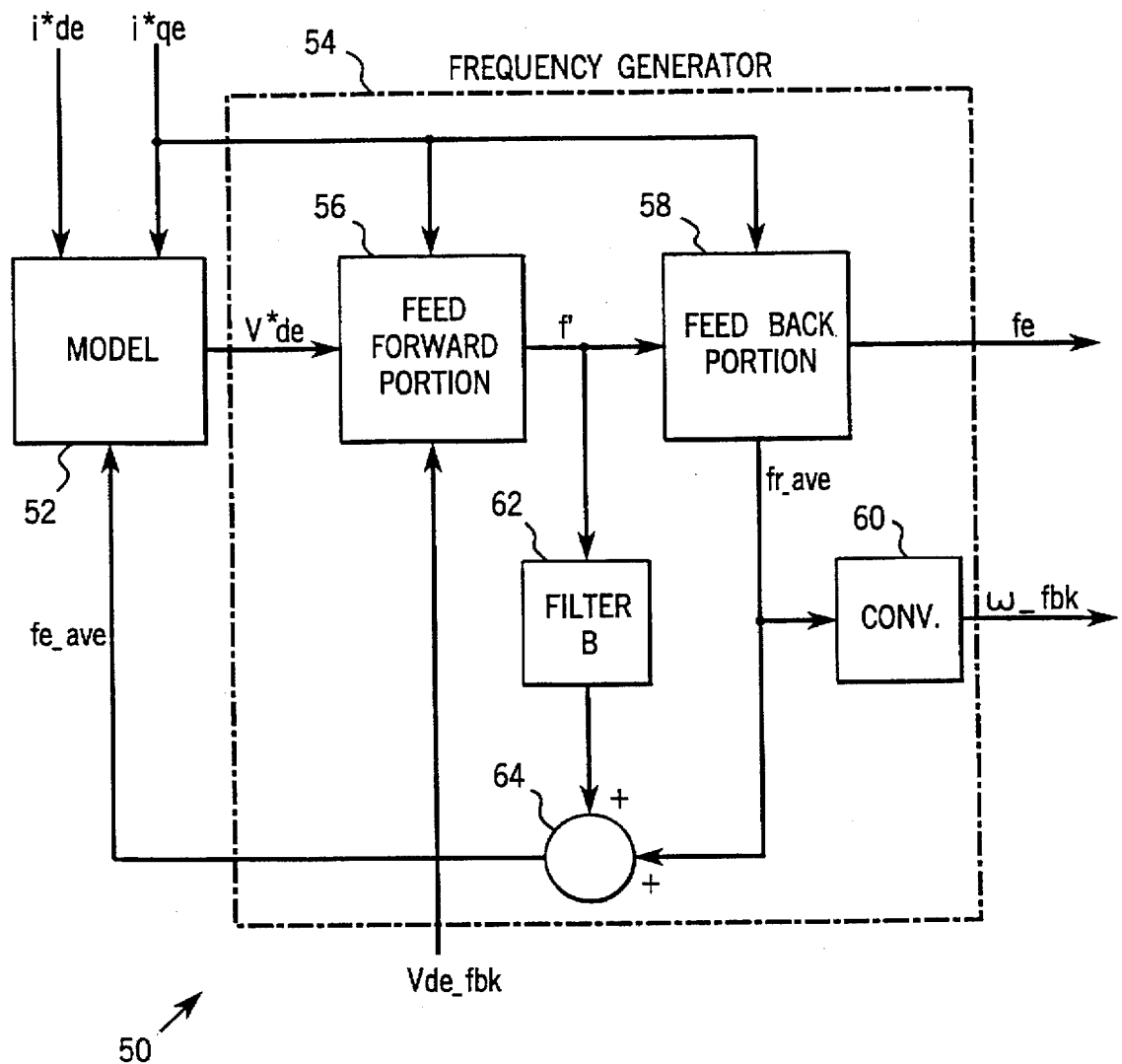
FIG. 2 is a diagrammatical representation of a portion of the motor controller of FIG. 1, including the frequency generator module.

As illustrated diagrammatically in FIG. 2, motor model and frequency generator circuit 50 generally includes two functional circuits, motor model 52 and frequency generator 54. Motor model and frequency generator circuit 50 receives as inputs current command signals i*de and i*qe, and feedback voltage signal Vde_fbk, and generates as output signals the stator electrical frequency fe and an estimated speed (or frequency) feedback signal ω_fbk. However, within circuit 50, motor model 52 determines a d-axis reference voltage signal V*de from the command current signals and from a filtered stator frequency signal generated by frequency generator 54. In turn, frequency generator 54 receives the d-axis reference voltage signal V*de from model 52, the q-axis command current signal i*qe and the d-axis voltage feedback signal Vde_fbk, and produces the frequency signal fe and speed feedback signal ω_fbk, as well as the filtered frequency signal fe_ave required by model 52.

In the presently preferred embodiment of controller 10, motor model 52 generates reference voltage signal V*de based upon the following relationship:

$$V^*de = [(rs)^*(i^*de)] - [(2\pi^*fe\_ave)^*\sigma^*Ls^*(i^*qe)] = [rs^*(i^*de)] - [2\pi^*fe\_ave^*\lambda qe]. \qquad (11)$$

The value of a may be determined from the following relationship:
(12)

In the presently preferred embodiment, the values of rs and a being predetermined from an autocommissioning procedure that is generally beyond the scope of the present invention. In addition, it should be noted that the value of the q-axis voltage signal Vqe may be determined based upon the relationship:

$$Vqe = [rs^*iqe] + [2\pi^*fe\_ave^*Ls^*ide] = [rs^*iqe] + [2\pi^*fe\_ave^* \lambda de]. \qquad (13)$$

Figure 3:
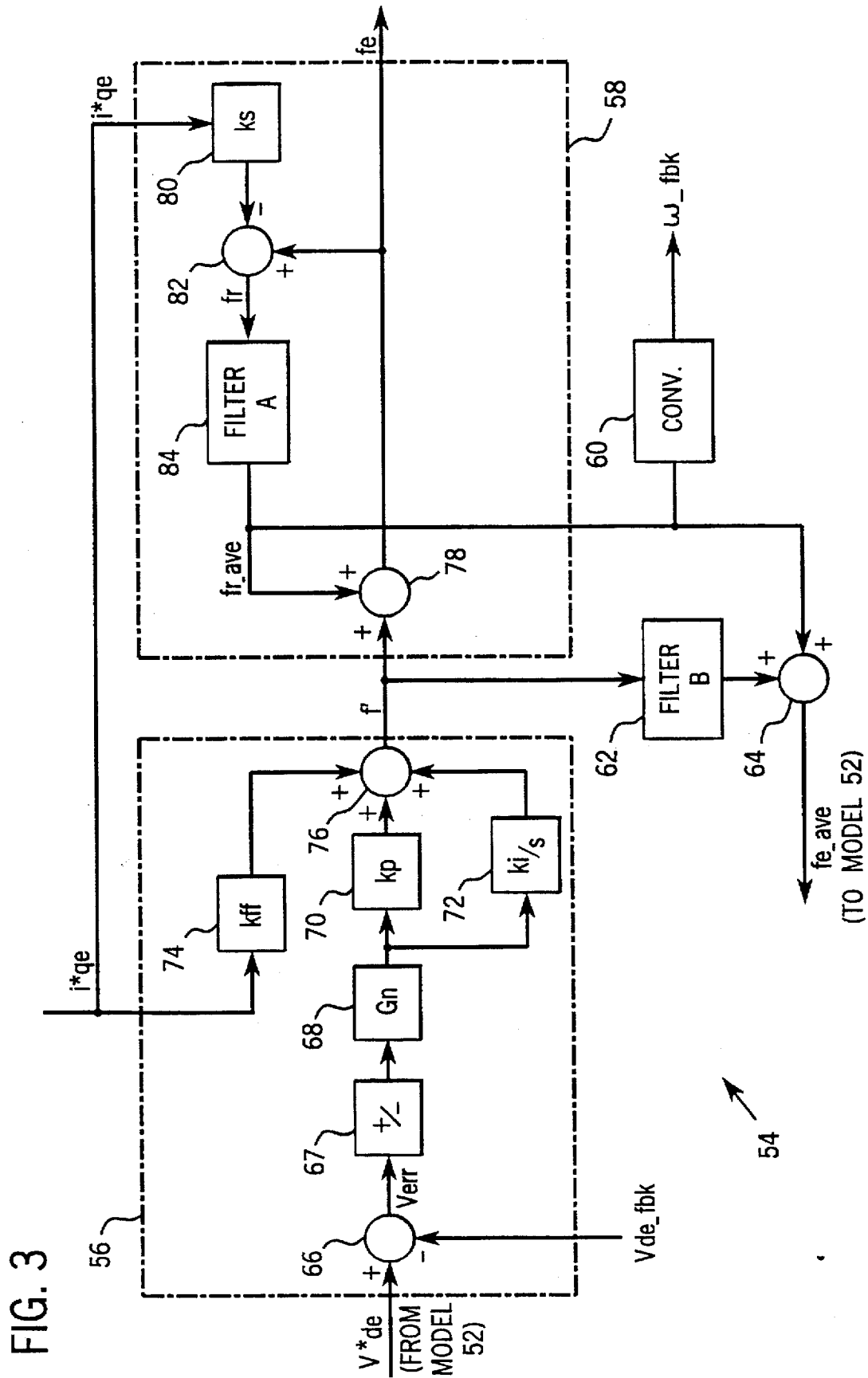
FIG. 3 is a detail diagrammatical view of the frequency generator of the motor controller of FIG. 1, illustrating the signal flow between the various blocks of the generator.

As illustrated in FIGS. 2 and 3, frequency generator 54 generally includes a feed forward portion 56, a feedback portion 58, a converter circuit 60 and a filter circuit 62. Feed forward portion 56 of generator 54 derives an intermediate frequency signal f' from the q-axis current command signal i*qe, the d-axis feedback voltage signal Vde_fbk and the model reference voltage V*de as described below. Feedback portion 58 derives stator electrical frequency fe from intermediate frequency signal f' and from the q-axis current command signal i*qe. Feedback portion 58 also produces a filtered rotor frequency estimate fr_ave that is used by converter 60 as a basis for generating speed feedback signal ω_fbk. Moreover, intermediate frequency signal f' is filtered by circuit 62 and algebraically combined with the filtered rotor frequency estimate at a summer 64 to produce filtered stator frequency fe_ave.

Figure 4:
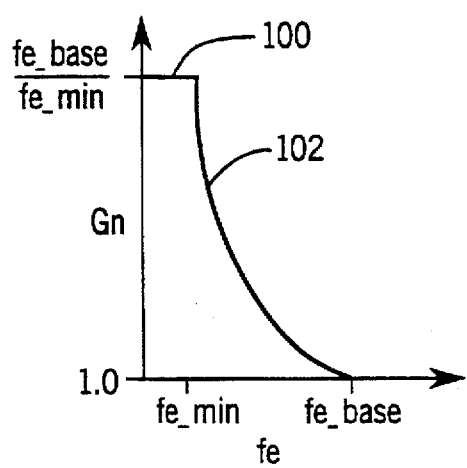
FIG. 4 is a graphical representation of values of a non-linear gain element Gn in accordance with a preferred embodiment of the frequency generator of FIG. 3.

FIG. 3 diagrammatically illustrates in greater detail the internal signal flow between the various functional components of frequency generator 54. As shown in FIG. 3, model reference voltage V*de is applied to the feed forward portion 56 of generator 54 and the difference between this signal and the d-axis feedback voltage signal Vde_fbk is determined by a summing point 66 to generate an error or difference signal Verr. This voltage error signal is applied to a coherence element 67 wherein the signal is assigned a positive or negative sign depending upon the value of re_ave. In particular, if the value of re_ave is equal to or greater than 0, error signal Verr is multiplied by a weighting factor of +1. If the value of fe_ave is less than 0, Verr is multiplied by a weighting factor of −1 at block 67. The resulting signal is then multiplied by a non-linear gain Gn at element 68. In the presently preferred embodiment, gain Gn is varied as illustrated in FIG. 4. As shown in FIG. 4, the value of Gn is held constant at a value of (fe_base/fe_min) within a first range of values of re, as indicated by reference numeral 100, where re_base is the rated frequency of motor 12 and fe_min is a lower frequency determined empirically and set to provide the desired response while maintaining stability of control. Within a region 102 of operation between the frequency fe_min and the rated frequency fe_base, the value of gain Gn is decreased non-linearly (proportional to the inverse of re) to a value of unity at rated frequency fe_base. This preferred feature of generator 54 affords compensation for the linear ramp in voltage below rated or base frequency fe_base, as compared to motor flux which is constant below base speed. Likewise, the q-axis stator flux can be approximated as the ratio of the d-axis synchronous reference frame voltage to the electrical operating frequency in radians. Once the base frequency fe_base is exceeded during operation of controller 10 gain Gn is held constant to maintain stable control. As will be appreciated to those skilled in the art, the approximation of flux values from voltage values afforded by the use of gain element Gn eliminates the need for integration techniques of the type used in known motor control devices.

Figure 5:
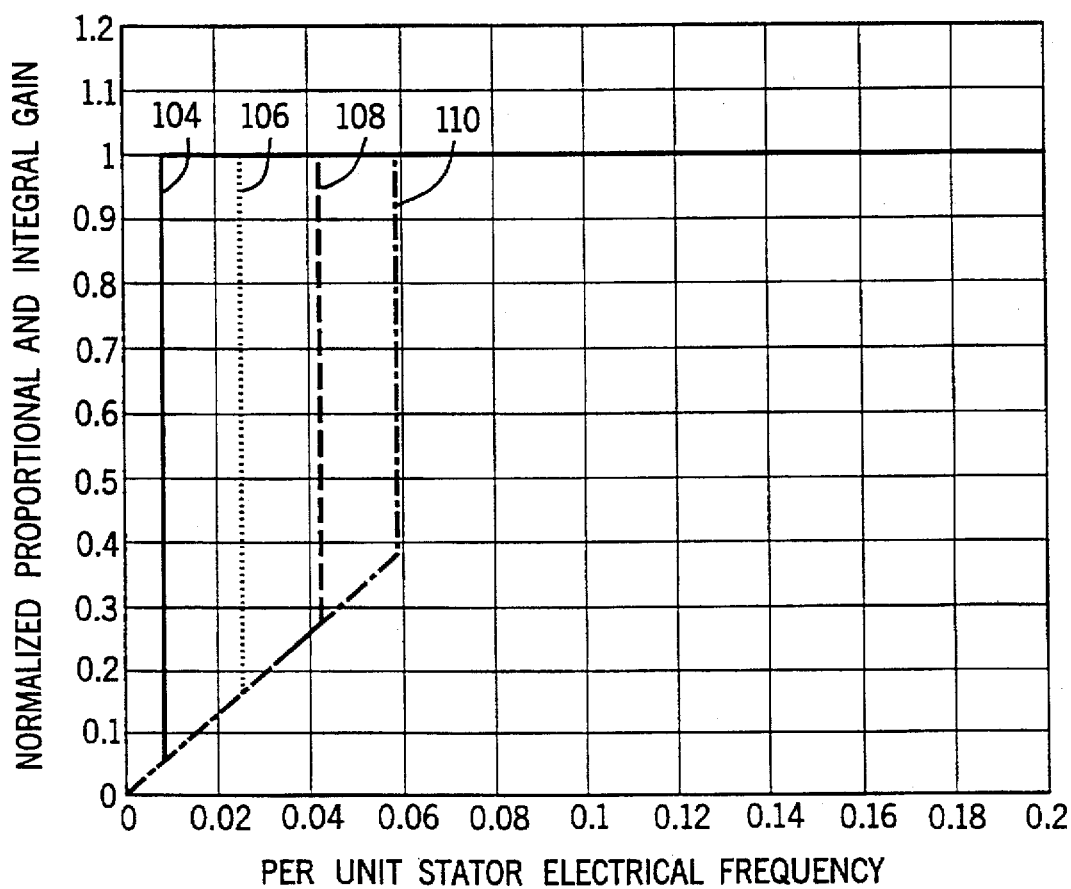
FIG. 5 is a graphical representation of values of proportional and integral gains for the frequency generator in accordance with a preferred embodiment, particularly suited to enhance startup characteristics for motor drives incorporating the generator.

From element 68, the product of error signal and gain Gn is applied to proportional and integral gain elements 70 and 72 to be multiplied by gains kp and ki. In the presently preferred embodiment, gains kp and ld are varied as illustrated in FIG. 5. It should be noted that FIG. 5 shows several different traces for gains kp and ki (normalized to a running value of unity) for different rated slip frequencies of motor 12, including trace 104 for a synchronous machine (slip frequency of zero), and traces 106, 108 and 110 for machines having rated slip frequencies of 1.0, 2.0 and 3.0 hertz respectively. In addition, the traces shown in FIG. 5 are presented based upon a per unit of stator electrical frequency basis. In the presently preferred embodiment of generator 54, gains kp and ld are ramped at a constant rate until a desired minimum shaft speed is reached (such as approximately 1/120 of rated speed), and are thereafter increased to unity. The point of step increase of gains kp and ki is determined by reference to the filtered rotor frequency value fr_ave, although the d-axis voltage feedback signal Vde_fbk value could also serve as the basis for this step change.

Figure 6:
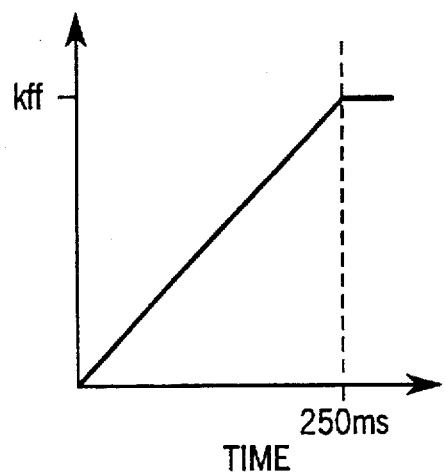
FIG. 6 is a graphical representation of values of feed forward gain in accordance with a preferred embodiment of the frequency generator.

In addition to manipulation of the reference and feedback voltage signals, feed forward portion 56 of generator 54 also receives the torque current command signal i*qe and multiplies the value of this quantity by a feedforward gain kff at element 74. In the presently preferred embodiment, gain kff is ramped up to a steady state value at a predetermined rate after startup of motor 12 as illustrated in FIG. 6. As shown in FIG. 6, the value of kff is ramped at a constant rate and reaches its full running value at a preset time after startup, such as 250 ms. The specific ramp rate and steady state value of this feed forward gain value will typically be adjusted for the specific motor ratings, particularly the motor rated slip. Moreover, the value of feedforward gain kff is preferably maintained at a fairly high level during running to ensure rapid response of controller 10 to changes in loading on motor 12.

From elements 70, 72 and 74, the values generated are algebraically summed at summer 76 to produce a frequency signal f'. This signal is then applied to filter element 62, as discussed more fully below, and to feedback portion 58 at a summing point 78, where it is algebraically summed with a filtered rotor frequency signal fr_ave. As illustrated in FIG. 3, the combination of frequency signal f' and rotor frequency signal fr_ave produces the stator electrical frequency signal fe. This value is transmitted from generator 54 to current regulating circuit 36 for use in determining d and q-axes voltage command signals V*ds and V*qs as discussed above. In addition to producing stator electrical frequency signal fe, feedback portion 58 receives torque current signal i*qe and multiplies this signal by a slip gain ks at block 80. Slip gain ks is preferably provided by the nameplate information or an adaption mechanism for motor 12. In addition, controller 10 could be configured to adapt slip gain ks to compensate for thermal changes in motor 12 during operation or in a constant horsepower region of operation of motor 12 to improve the speed estimate provided by circuit 54. The resulting signal is then applied to a summer 82 along with the stator electrical frequency signal fe to generate a difference signal fr corresponding to a rotor electrical frequency estimate. The rotor electrical frequency signal is then applied to a filter element 84 to produce filtered rotor frequency signal fr_ave.

Figure 7:
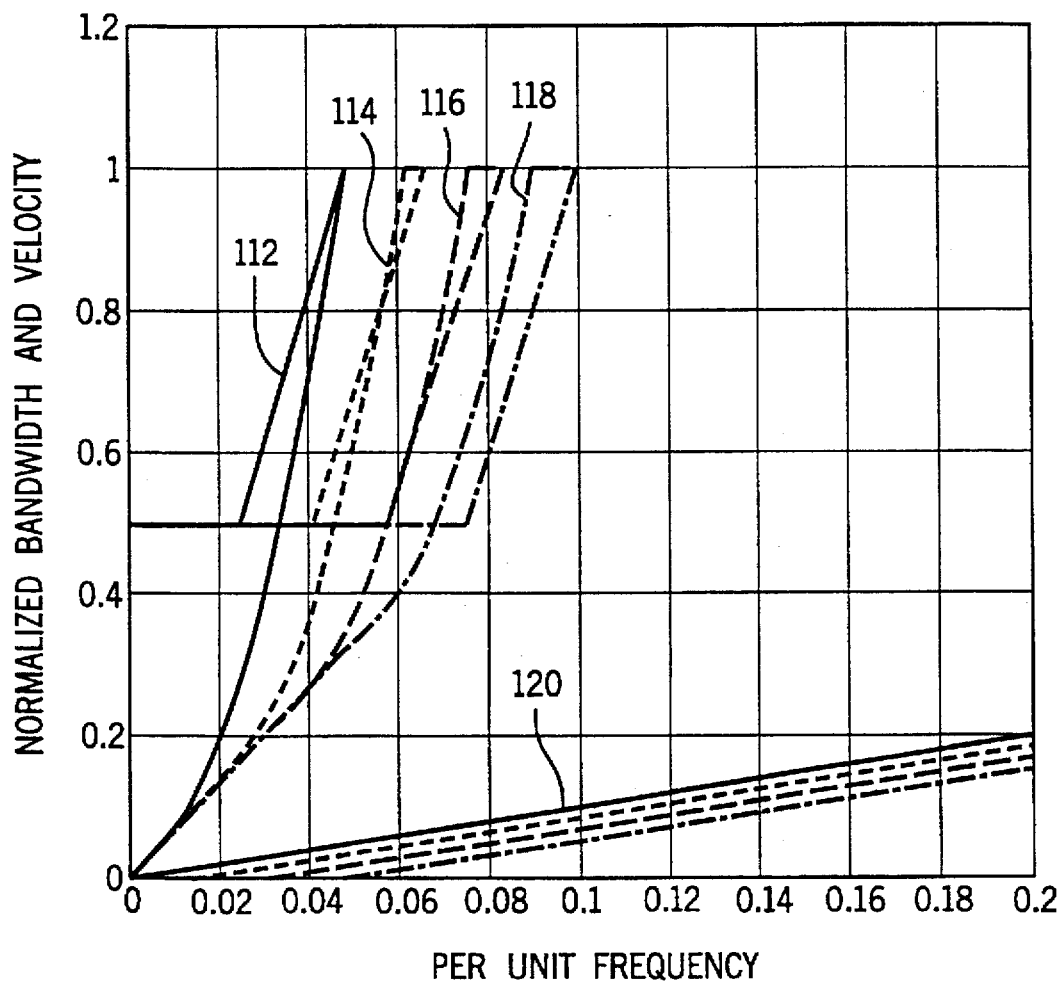
FIG. 7 is a graphical representation of values of the normalized bandwidth for a filter element in a feedback portion of the frequency generator, designed to enhance performance of motor drives incorporating the generator upon startup.

Similar to the PI gains kp and ki, in the presently preferred embodiment, filter element 84 has bandwidth characteristics that are varied during starting and running periods of operation of motor 12. The frequency characteristics of filter 84 are graphically depicted in FIG. 7 for machines of different rated slip frequencies, including, curve 112 for a synchronous machine (slip frequency of zero), and curves 114, 116 and 118 for machines having rated slip frequencies of 1.0, 2.0 and 3.0 hertz respectively. The curves shown in FIG. 7 are presented based upon a per unit of stator electrical frequency basis. In addition, lines 120 in FIG. 7 represent the shaft speed of motor 12 per unit of stator frequency for each of the slip frequency ratings. It should be noted that, in the preferred embodiment the bandwidth of filter 84 is increased linearly as a function of the filtered stator electrical frequency fe_ave during a first phase of running and until a minimum value of rotor electrical frequency fr_ave is reached. Thereafter, the bandwidth of filter 84 is increased rapidly to a steady state running bandwidth normalized in FIG. 7 to a value of unity. As indicated by the line segments redecending from the unity value in FIG. 7, as the speed of motor 12 is reduced during operation, the bandwidth value for filter 84 is ramped along a line between unity and a normalized value of 0.5.

In addition to contributing to the derivation of the stator electrical frequency value re, filtered rotor frequency signal if_ave is applied to convening circuit 60 where it is multiplied by a constant conversion factor to produce speed feedback signal ω_fbk. This speed feedback signal is used by speed regulating circuit 32 of controller 10 to generate torque current command signal i*qe as described above. Moreover, as illustrated in FIG. 1, stator electrical frequency signal fe is applied to an integrator 126 to generate values of θe for use in transformation circuits 34 and 48 as indicated above with reference to relationships (1) and (10).

Returning to FIG. 3, frequency signal f' is applied to filter 62 prior to being combined algebraically with filtered rotor frequency signal if_ave. In the presently preferred embodiment, filter 62 passes a constant bandwidth equal to the normalized unity bandwidth of filter 84. Once filtered at element 62, the two signals are combined at summer 64 to generate filtered stator electrical frequency estimate signal fe_ave. This signal is then transmitted to model 52 for use in deriving the d-axis voltage command signal V*de as described above.

It should be noted that several important advantages flow from the preferred structure and operation of controller 10, and particularly of frequency generator 54. For example, the frequency signals produced by generator 54 are all performed in the synchronous reference frame, based upon reference values of current and voltage, and upon feedback voltage signals only. Thus, controller 10 is able to properly adjust output control signals to maintain proper field oriented control without recourse to sensed speed signals. Moreover, it has been found that the preferred embodiment described above provides enhanced performance at lower speeds than heretofore known variable frequency drives, and eliminates or reduces the need to compensate or cancel unwanted effects of drift and offset common in analog circuitry.

It should also be noted that the foregoing preferred embodiment provides improved startup characteristics, particularly by virtue of controlled variation of gains kff, kp and ki, and due to the preferred relationship between the bandwidths of filters 64 and 84, as described above. In particular, when controller 10 is commanded to start motor 12, lower gains are preferred and change as the stator electrical frequency increases, such that motor 12 can start and voltage can be established on the motor, resulting in a detectable value of d-axis voltage feedback signal Vde_fbk. Feed forward gain kff is subsequently altered depending upon operating conditions and provides rapid adaptability to changing load conditions. However, during startup, PI gains kp and ki are maintained low, requiring ramping up of feed forward gain kff to prevent pull-out during a start. Moreover, filter 84 effectively acts as a "Wacking filter" which holds the rotor frequency estimate of the motor and tracks this frequency. Upon startup of motor 12, the bandwidth of filter 84 is maintained low as compared to that of filter 62, effectively resulting in dominance of the feedforward component f' of the frequency estimate fe_ave during this phase of operation. Thereafter, because the bandwidth of filter 84 is gradually increased, the feedforward component f' and feedback component fr_ave of the filtered stator frequency estimate fe_ave approach parity as an acceptable or minimum rotor frequency estimate is determined.

In addition to the advantages mentioned above, those skilled in the art will note that because controller 10 transforms feedback voltages to the synchronous reference frame (see element 48 described above), and performs subsequent operations on values in the synchronous reference frame, phase shifting inherent in operations performed in the stationary or a-b-c reference frames due to the required filtering is effectively avoided. Moreover, while known motor controllers may function as speed regulating drives by operating on an input or reference speed signal, such devices typically feed forward the speed reference signal and feedback a speed feedback signal, and thus cannot function effectively as torque regulating drives. In the system described above, the preferred form of feedback portion 58, including filter 84, provides tracking capability when controller 10 is operated as either a speed or torque regulating drive system.

While the embodiments illustrated in the FIGURES and described above are presently preferred, it should be understood that these embodiments are offered by way of example only and may be adapted to various other structures. For example, rather than stepped increases in PI gains kp and ld, more gradual increases may be implemented following an initial startup ramping. Moreover, while filter 84 above has been described as a low pass filter having bandwidth characteristics varying with frequency, a lag-lead or lead-lag filter may be provided to perform a similar rotor frequency "tracking" function.

We claim:

1. A method for starting an alternating current electric motor having a stator and a rotor, the method comprising the steps of:

(a) generating a first component of an electrical frequency signal from a voltage reference signal, a voltage feedback signal, and a current reference signal;

(b) generating a second component of the electrical frequency signal from the first component and from the current reference signal;

(c) filtering the first and second components of the frequency signal such that the first component of the frequency signal dominates the frequency signal during a startup phase of operation of the motor;

(d) filtering the first and second components of the frequency signal such that the first component of the frequency signal does not dominate the frequency signal following the startup phase of operation; and (e) combining the first and second components to generate the electrical frequency signal as a basis for generating control signals for driving the motor.

2. The method of claim 1, wherein the first and second components of the frequency signal are filtered in step (d) such that the first and second components of the frequency signal are in relative parity following the startup phase of operation.

3. The method of claim 1, wherein the frequency signal is representative of electrical frequency of the motor stator.

4. The method of claim 1, wherein the frequency signal components are generated from the voltage and current reference signals and from the voltage feedback signal in a synchronous reference frame.

5. The method of claim 1, wherein the first component of the frequency signal is filtered during the stamp phase of operation to limit the first component to a first bandwidth and the second component is filtered during the startup phase of operation to limit the second component to a second bandwidth less than the first bandwidth.

6. The method of claim 5, wherein the second component of the frequency signal is filtered during a steady state phase of operation to limit the second component to a bandwidth approximately equal to the first bandwidth.

7. The method of claim 1, wherein the second component of the frequency signal is representative of electrical frequency of the rotor.

8. A method for control of an alternating current electric motor having a rotor and a stator, the method comprising the steps of:

(a) generating a torque current command signal representative of a desired current;

(b) multiplying the current command signal by a first gain value;

(c) generating a d-axis voltage command signal representative of a desired voltage and a d-axis voltage feedback signal representative of actual voltage applied to the motor;

(d) combining the voltage command and voltage feedback signals to generate a voltage error signal;

(e) multiplying the voltage error signal by at least a second gain value;

(f) combining the signals produced in steps (b) and (e) to generate a frequency signal as a basis for regulating control signals for driving the motor; and (g) increasing the first and second gain values as the motor increases speed during a startup phase of operation.

9. The method of claim 8, comprising the further step of increasing the first gain value at a constant rate during the startup phase of operation.

10. The method of claim 8, comprising the further step of multiplying the voltage error signal by proportional and integral gain values in step (e).

11. The method of claim 8, comprising the further step of increasing the second gain value at a rate based upon stator electrical frequency.

12. The method of claim 11, comprising the further step of increasing the second gain value at a higher rate once the motor reaches a predetermined speed.

13. An apparatus for controlling an electric motor comprising:

an inverting circuit for converting direct current power to controlled alternating current power for driving the motor;

regulating circuitry configured to generate current reference signals representative of desired current levels;

feedback circuitry configured to generate voltage feedback signals representative of voltage applied to the motor;

a motor model circuit coupled to the regulating circuitry and to the feedback circuitry, the motor model circuit being configured to receive the current reference signals and to generate a voltage reference signal; and a frequency generator circuit coupled to the motor model circuit and to the inverting circuit and configured to receive the voltage reference signal and to generate a frequency signal during a startup phase of operation of the motor and following the startup phase of operation.

14. The apparatus of claim 13, wherein the motor model circuit and frequency generator are configured to maintain field oriented control based upon the frequency signal.

15. The apparatus of claim 13, wherein the regulating circuitry generates torque and flux current reference signals in a sychronous reference frame.

16. The apparatus of claim 15, wherein the feedback circuitry generates a d-axis voltage feedback signal in the synchronous reference frame.

17. The apparatus of claim 16, wherein the motor model circuit generates a d-axis voltage reference signal in the synchronous frame.

18. The apparatus of claim 17, wherein frequency generator circuit is configured to combine the d-axis voltage reference signal and the d-axis voltage feedback signal to generate a voltage error signal, to multiply the torque current reference signal by a first gain value, to multiply the voltage error signal by a second gain value and to combine the resulting signals to generate the frequency signal.

19. The apparatus of claim 18, wherein the frequency generator circuit increases the gain values during the startup phase of operation.

* * * * *